Patented Apr. 8, 1924.

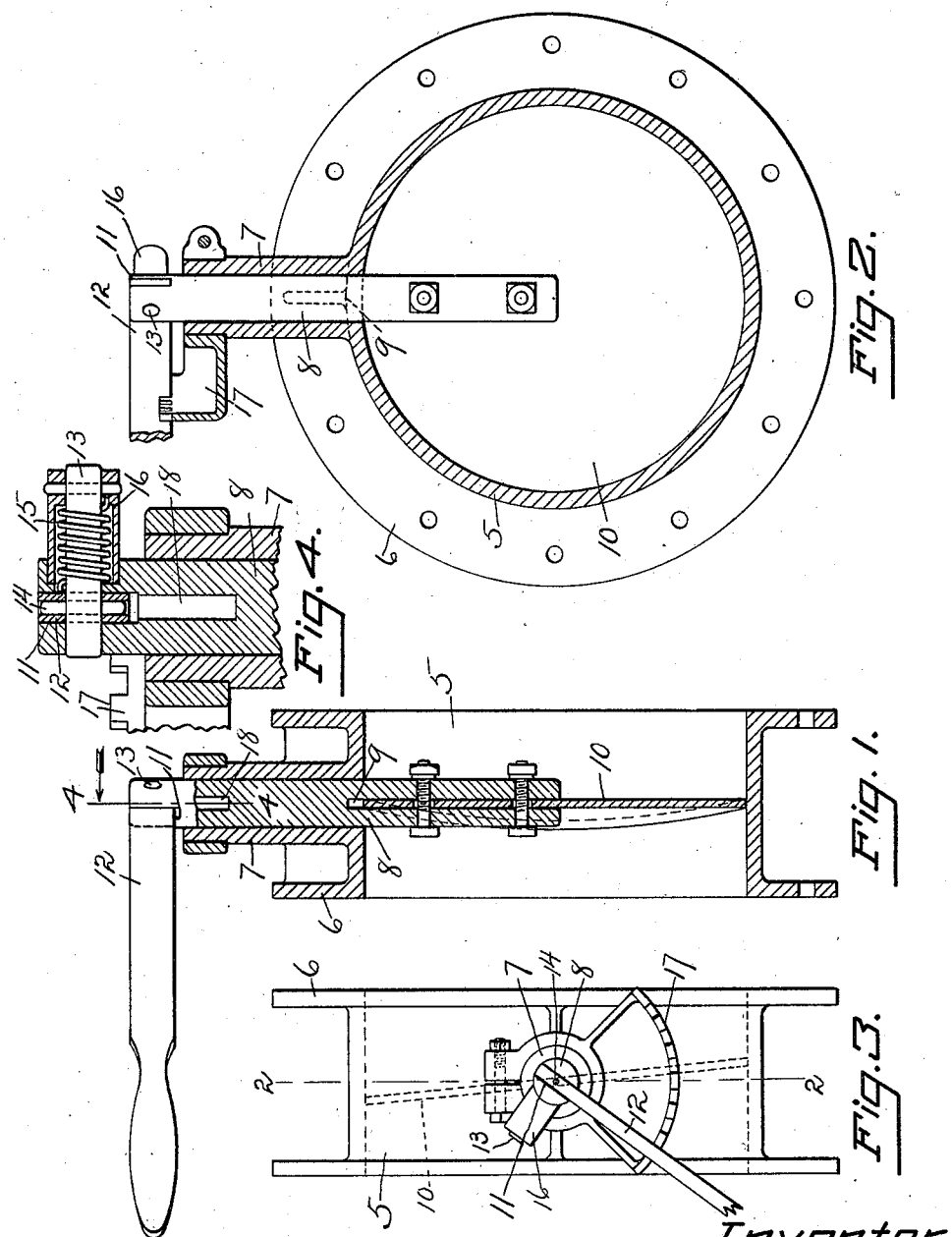

1,490,039

UNITED STATES PATENT OFFICE.

IRA H. SPENCER, OF WEST HARTFORD, CONNECTICUT, ASSIGNOR TO THE SPENCER TURBINE COMPANY, OF HARTFORD, CONNECTICUT, A CORPORATION OF CONNECTICUT.

VALVE.

Application filed July 8, 1918. Serial No. 243,980.

*To all whom it may concern:*

Be it known that I, IRA H. SPENCER, a citizen of the United States, residing at West Hartford, in the county of Hartford and State of Connecticut, have invented a new and Improved Valve, of which the following is a specification.

My invention relates more especially to that class of valves that have a pivotal action to close an opening through a conduit, and an object of my invention, among others, is to provide a valve of this class that shall be extremely simple in its construction and efficient in its action.

One form of valve embodying my invention and in the construction and use of which the objects herein set out, as well as others, may be attained, is illustrated in the accompanying drawings, in which—

Figure 1 is a view in central lengthwise section through a valve casing having a valve embodying my invention.

Figure 2 is a view in cross section through the same on plane denoted by dotted line 2—2 of Figure 3.

Figure 3 is a view of the casing looking toward the end of the spindle.

Figure 4 is a detail view, scale enlarged, in section through the valve handle and spindle.

My invention is especially designed for application to valves employed for controlling the flow of the lighter fluids, as air, through conduits. In the accompanying drawings the numeral 5 indicates a casing having a round opening therethrough and flanges 6 serving as a means for attachment of the casing to a length of pipe. A neck 7 extends radially from the casing, preferably midway between the flanges 6, this neck being of considerable length to afford a rigid bearing for a spindle 8 that projects through the neck and for some distance into the opening through the casing. The inner end of the spindle has a slot 9 cut into it from its end to such extent that the slot will terminate at or a trifle beyond the wall of the opening through the casing. A valve 10, of disc shape, is secured in the slot 9 as by means of bolts and nuts, and as shown in Figure 1 of the drawings. Preferably the openings in the valve to receive the bolts are slightly larger than the bolts to permit adjustable movement of the valve within the spindle to accurately position it with respect to the opening through the casing before the nuts are tightened to secure the valve rigidly to the spindle. The valve is slightly oval in form and its edges are ground at such angle as to accurately fit the inner surface of the opening through the casing before the valve is turned to a position at right angles to the axis of said opening, the closed position of the valve being indicated in dotted outline in Figure 3. The spindle 8 has a slight endwise movement in the neck 7 sufficient to permit the valve to accurately seat itself when turned to its closed position.

A handle slot 11 is made in the outer end of the spindle to receive a handle 12 that is pivotally attached to said spindle as by means of a pivot stud 13 rotatably mounted in the side parts of the spindle and secured to the handle as by means of a pin 14. A spiral spring 15 has one end secured to the spindle 8 and its opposite end rigidly connected with the stud 13, in the structure herein shown a housing 16 rigidly secured to the spindle having an opening to receive the end of the spring. This housing extends with its open edge into a recess in the side of the spindle 8 to completely inclose the spring. Any suitable means for securing the housing to the stud 13 may be employed, a small pin being shown herein.

A quadrant 17 is adjustably secured upon the end of the neck 7, said quadrant having notches to receive one edge of the handle 12 that has a slight pivotal movement for disengagement from and engagement with said notches. As the valves in different structures will not all assume the same position when they are closed, the quadrant is made adjustable upon the pivot constituted by the neck 7, so that in each structure the notches may be properly positioned to receive the handle 12.

The spindle 8 extends into the opening through the casing preferably a distance equal at least to one-half the diameter of the valve, and the latter being comparatively thin it is supported and stiffened by the spindle.

The pin 14 extends through the handle and into the stud 13, the opening for said pin preferably extending entirely through the handle and stud. In order to facilitate removal of the handle a well 18 is bored into the end of the spindle from the bottom of the handle slot 11, this well being of a depth slightly greater than the length of the pin 14. Said pin fits its opening tightly enough to prevent accidental removal, and when it is desired to remove the handle the pin may be driven through the handle and stud into the well 18 and from which it may be readily removed after the handle has been taken off.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

I claim—

1. A casing having an opening therethrough, flanges extending around the casing at opposite ends thereof, a smooth surfaced neck projecting from and supported by the casing between said flanges and spaced from the latter, a valve spindle rotatably mounted and entirely supported within said neck, a valve secured to the spindle within said opening and larger in diameter than said opening, and means for rotating the spindle.

2. A valve casing having an opening therethrough and a long neck projecting from one side thereof, a spindle extending through said neck and projecting partially across and for a substantial distance within said opening and wholly supported in said neck, said spindle having a slot in its inner end, a valve plate secured in said slot and wholly supported by said spindle, and means for rotating the valve spindle.

3. A valve casing having an opening therethrough and a long neck projecting from one side thereof, a spindle extending through said neck and projecting partially across and for a substantial distance within said opening and wholly supported in said neck, said spindle having a slot in its inner end, a valve plate secured in said slot and wholly supported by said spindle, means for adjusting the position of the plate within the spindle, means for securing the plate rigidly to the spindle, and means for rotating the spindle.

4. A valve casing having an opening therethrough and a long neck projecting from one side thereof, a spindle extending through said neck and projecting for a substantial distance within said opening, said spindle being movable lengthwise within said neck to properly position a valve within said opening and a valve plate secured to said spindle to close said opening, said plate being adjustable in the direction of its diameter and of the axis of the spindle.

5. A valve casing having an opening therethrough and a long neck projecting from one side thereof, a spindle extending through said neck and projecting partially across and for a substantial distance within said opening and wholly supported within said neck, said spindle having a slot in its inner end extending farther than the amount of projection of the spindle into the opening, a valve plate secured within said slot and thereby wholly supported by said spindle, and means for rotating the spindle.

6. A valve casing having an opening therethrough and a long neck projecting from one side thereof, a spindle extending through said neck and projecting for a substantial distance within said opening, said spindle having a slot in its inner end extending a distance greater than the amount of projection of said spindle into the opening, said spindle having a slight lengthwise movement within said neck, and means for rotating the spindle.

7. A valve casing having a bearing projecting from one side thereof, a valve spindle rotatably mounted in said bearing and projecting into an opening in the casing, a valve secured to said spindle within said opening, a stud, a handle rotatably secured to the spindle by means of said stud, and a pin to secure the handle in place, said spindle having a well underlying the pin to receive it when driven inward to disengage it from the handle.

8. A valve casing having a bearing neck projecting from one side thereof, a spindle rotatably mounted in said neck and projecting into an opening in the casing, a valve secured to said spindle, a quadrant, means for adjustably varying the position of the valve and quadrant with respect to each other, and a handle pivotally attached to the spindle and shaped to engage notches in said quadrant by a movement upon its pivot.

9. A valve casing having a bearing neck projecting from one side thereof, a spindle rotatably mounted in said bearing and projecting into an opening in the casing, a valve secured to said spindle within said opening, a stud extending across a slot in the outer end of said spindle, a handle secured to said stud within said slot, a spring having one end secured to said spindle and the other end rigidly connected with said stud, and means to receive the handle to locate the spindle in different rotatable positions.

10. A valve casing having a bearing neck projecting from one side thereof, a spindle rotatably mounted in said neck and projecting into an opening in the casing, a valve secured to the spindle within said opening, a stud projecting across a slot in the outer end of the spindle, a handle secured to said stud within said slot, a spring surrounding the stud and having one end secured to the spindle and its opposite end to a housing, a housing surrounding the spring, means for rigidly securing the housing to the stud, and means to receive said handle to lock it with the spindle in different rotatable positions.

11. A valve casing having a bearing neck projecting from one side thereof, a spindle extending through said neck and into an opening in the casing, a valve secured to the spindle within the casing, a stud projecting across a slot in the outer end of the spindle, a handle mounted upon said stud, a pin projecting through the handle and stud opposite a well formed in the bottom of the slot in the end of the spindle, a housing surrounding said stud, a spring surrounding the stud and having one end secured to the spindle and its opposite end secured to said housing, means for rigidly securing the housing to the stud, and means to receive the handle to locate the spindle in different rotatable positions.

12. A valve casing, a valve spindle rotatably mounted in the casing and having a slot and a well in the bottom of the slot, a valve secured to said spindle, a handle pivotally attached to said spindle within said slot, and a pin passing through the handle and its pivot in line with said well.

IRA H. SPENCER.